United States Patent [19]

Ma et al.

[11] Patent Number: 5,648,405
[45] Date of Patent: Jul. 15, 1997

[54] AQUEOUS INK JET INKS

[75] Inventors: Sheau-Hwa Ma, Chadds Ford; Walter Raymond Hertler, Kennett Square, both of Pa.

[73] Assignee: E. I. Du Pont de Nemours and Company, Wilmington, Del.

[21] Appl. No.: 998,215

[22] Filed: Dec. 30, 1992

[51] Int. Cl.$^6$ .................................................. C03C 17/00
[52] U.S. Cl. .................... 523/160; 106/31.27; 106/31.6; 523/161; 524/495; 524/496; 524/514; 524/556; 524/599; 524/606
[58] Field of Search ..................... 523/161, 160; 524/556, 495, 496, 514, 599, 606; 106/20 D

[56] References Cited

U.S. PATENT DOCUMENTS

| | | | |
|---|---|---|---|
| 4,597,794 | 7/1986 | Ohta et al. | 106/20 |
| 5,085,698 | 2/1992 | Ma et al. | 106/20 |
| 5,272,201 | 12/1993 | Ma et al. | 524/505 |
| 5,310,778 | 5/1994 | Shor et al. | 524/556 |

*Primary Examiner*—Paul R. Michl
*Assistant Examiner*—John J. Guarriello

[57] ABSTRACT

Aqueous ink jet ink compositions comprising an aqueous carrier medium, a colorant, such as a dye or a pigment, and a polyampholyte containing at least one carboxylic acid group and at least one amine group have improved dispersion stability and flexibility in manufacturing.

12 Claims, No Drawings

AQUEOUS INK JET INKS

FIELD OF THE INVENTION

This invention relates to aqueous inks for ink jet printers and, more particularly, to aqueous pigmented ink jet inks which have improved dispersion stability and provide more flexibility for manufacturing.

BACKGROUND OF THE INVENTION

Ink jet printing is a non-impact method for recording information in response to an electronic signal, such as that generated by a computer. In the printer, the electronic signal produces droplets of ink that are deposited on a substrate such as paper or transparency film. Ink jet printers have found broad commercial acceptance due to their reliability, relatively quiet operation, print quality, and low cost. Thermal or bubble jet printers have been especially successful and have found broad application as output devices for personal computers in the office and the home.

Both dyes and pigments have been used as colorants for ink jet inks. While the dye-based inks in general are superior in color properties, they have several disadvantages as compared to pigment-based inks. The dyes are usually water soluble and remain so after drying on the substrate. They are easily redissolved by water spills, and the image smears on contact with the felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Aqueous pigment dispersions are well known and have been used commercially in coating applications such as paints. A pigment dispersion is generally stabilized by either a non-ionic or ionic technique. In the non-ionic technique, the pigment particles are stabilized by a dispersant compound that has a water-soluble, hydrophilic section that extends into the aqueous medium and provides entropic or steric stabilization. Representative compounds useful for this purpose include polymers of polyvinyl alcohol, cellulosics, and ethylene oxide modified phenols. While the non-ionic technique is not sensitive to pH changes or ionic contamination, it has a major disadvantage for many applications in that the final product is water sensitive.

In the ionic technique, the pigment particles are stabilized by a dispersant compound containing ionizable groups, such as acrylic, maleic, or sulfonic acid. The compound provides stabilization through a charged double layer mechanism whereby ionic repulsion hinders the particles from flocculation. The non-ionic form of the dispersant, which remains after the ink is dry, have reduced water solubility, resulting in an ink which is not moisture sensitive. In addition, the dispersant should also have strong binding to the pigment surface.

Polymer dispersants having both random and block structures are known in the art as effective for use in ink jet inks.. For example, U.S. Pat. No. 4,597,794 teaches an aqueous ink for ink jet printers in which the pigment is contained in a polymer having anionic hydrophilic segments and aromatic hydrophobic segments that adhere to the pigment surface. U.S. Pat. No. 5,085,698 teaches the use of AB or BAB block polymers as pigment dispersants for aqueous ink jet inks. While it is easier and cheaper to make the random polymers, they are not as effective as the block polymers in stabilizing the pigment dispersion. The block polymers, however, usually require special synthetic techniques such as anionic or group transfer polymerization.

SUMMARY OF THE INVENTION

The present invention provides an aqueous ink composition particularly adapted to meet the demanding requirements of ink jet printers, the ink composition comprising:

(a) an aqueous carrier medium, (b) a colorant, and (c) a polyampholyte containing at least one carboxylic acid group and at least one amine base group.

DETAILED DESCRIPTION OF THE INVENTION

The ink jet ink compositions of this invention are particularly suited for use in ink jet printers in general, and thermal ink jet printers in particular. The ink jet ink compositions encompass both pigments and dyes as colorant. The inks may be adapted to the requirements of a particular ink jet printer to provide a balance of light stability, water fastness, smear resistance, optical density, drying rate, and low toxicity.

AQUEOUS CARRIER MEDIUM

The aqueous carrier medium is water or a mixture of water and at least one water-soluble organic component. Deionized water is commonly used. Representative examples of water-soluble organic solvents are disclosed in U.S. Pat. No. 5,085,698, the disclosure of which is incorporated herein by reference. Selection of a suitable mixture of water and water-soluble organic solvent depends upon requirements of the specific application, such as desired surface tension and viscosity, the selected pigment, drying time of the pigmented ink jet ink, and the type of media substrate onto which the ink will be printed. A mixture of a water-soluble organic solvent having at least 2 hydroxyl groups, e.g. diethylene glycol, and deionized water is preferred as the aqueous medium. The aqueous carrier medium is present between 30% and 95%, preferably 60% and 95% by weight, based on the total weight of the ink.

COLORANT

The colorant for the inks of the present invention may be a pigment or a dye. The term "pigment" as used herein refers to an insoluble colorant.

Dyes which are commonly used in aqueous ink jet inks, such as, for example, acid dyes, basic dyes, direct dyes, food dyes, and reactive dyes are suitable colorants for the ink compositions of the present invention.

In the preferred embodiment of the present invention, the colorant is a pigment. A wide variety of organic and inorganic pigments, alone or in combination, may be selected to make the ink. Representative dry pigments and water wet presscakes that may be selected to advantage are disclosed in U.S. Pat. No. 5,085,698, the disclosure of which is incorporated by reference. Pigments with acidic or basic functional groups on their surface, or which can be modified to contain such groups, are particularly useful for the present invention. For example, most carbon blacks have chemisorbed oxygenated complexes, primarily acidic in nature (e.g. carboxylic, quinonic, lactonic or phenolic groups) on their surfaces to varying degrees depending on the conditions of manufacture. These groups can react with the free base groups on the polyampholyte when it is neutralized with a base and used as an anionic dispersant. The acid-base interaction is stronger than the Van der Waals forces or hydrogen bonding, hence a stronger binding of the dispersant to the pigment for greater dispersion stability.

For ink jet ink applications, the pigment particles need to be sufficiently small to permit free flow of the ink through the ink jet printing device, especially at the ejecting nozzles that usually have a diameter ranging from 10 micron to 50 micron. The particle size also has an influence on the pigment dispersion stability and on color strength and gloss. The range of useful particle size is approximately 0.005 micron to 15 micron. Preferably, the pigment particle size should range from 0.005 micron to 1 micron.

In the case of organic pigments, the ink may contain up to approximately 30% pigment by weight, but will generally be in the range of approximately 0.1 to 15%, preferably approximately 0.1 to 5%, by weight of the total ink composition. If an inorganic pigment is selected, the ink will tend to contain higher weight percentages of pigment because inorganic pigments generally have higher specific gravities than organic pigments.

Up to 20% of dye may be present, based on the total weight of the ink composition.

POLYAMPHOLYTE

Polyampholytes are polymers capable of possessing both positively charged (cationic) and negatively charged (anionic) moieties. The polyampholytes which are particularly useful in the present invention are vinyl addition polymers containing free carboxylic acid groups and free basic amine groups, examples of which include acrylic polymers, methacrylic polymers, styrene acrylic copolymers, and styrene maleic anyhydride copolymers. These polymers can be advantageously prepared by copolymerizing the acid monomers and the base monomers by ordinary solution or emulsion techniques with free-radical initiators.

Other polymerization processes which can be effectively employed to prepare polyampholytes include anionic and group transfer polymerization as described in U.S. Pat. No. 4,508,880, the disclosure of which is incorporated herein by reference. Polymers so prepared have precisely controlled molecular weight and very narrow molecular weight distribution. The polymer typically has a dispersity less than 2, generally in the range of 1.0 to 1.4. Dispersity is the polymer weight average molecular divided by its number average molecular weight.

Examples of useful monomers containing acid or acid precursor functions include acrylic acid, methacrylic acid, crotonic acid, itaconic acid, itaconic acid monoester, maleic acid, maleic acid monoester, maleic anhydride, fumaric acid, fumaric acid monoester, and the like. The acid groups on the monomers may be blocked for the polymerization processes that are sensitive to active hydrogens, such as anionic or group transfer polymerization, and the blocking groups removed after polymerization. Examples of blocked monomers that generate acrylic or methacrylic acid after removal of the blocking group include trimethylsilyl acrylate, trimethylsilyl methacrylate, 1-butoxyethyl acrylate, 1-butoxyethyl methacrylate, 1-ethoxyethyl acrylate, 1-ethoxyethyl methacrylate, 2-tetrahydropyranyl acrylate, and 2-tetrahydropyranyl methacrylate.

The preferred base monomers are the amine containing monomers. The amine groups may be primary, secondary, or tertiary amine groups, or mixtures thereof. Examples of amine containing monomers include N,N-dimethylaminoethyl acrylate, N,N-dimethylaminoethyl methacrylate, N,N-diethylaminoethyl methacrylate, t-butylaminoethyl methacrylate, 2-N-morpholinoethyl acrylate, 2-N-morpholinoethyl methacrylate, 4-aminostyrene, 2-vinylpyridine, 4-vinylpyridine, and the like. Alternatively, functional monomers or polymers may be reacted with an amine to generate the amine groups, e.g. reacting a copolymer of glycidyl methacrylate with dimethylamine.

The amounts of acid groups and amine groups within a particular polyampholyte can vary, and are selected based on the requirements of a particular application, such as the desired ionic character, pH, dispersion stability, etc.

As is known to those skilled in the art, the acid monomers and the base monomers can be copolymerized with hydrophobic non-functional monomers to adjust the polymer properties for optimal ink performance, such as pigment dispersion stability, water-fastness, smear resistance, viscosity, surface tension, etc. Monomers that are particularly useful for this purpose include methyl acrylate, ethyl acrylate, propyl acrylate, n-butyl acrylate, hexyl acrylate, 2-ethylhexyl acrylate, phenyl acrylate, benzyl acrylate, 2-phenylethyl acrylate, hydroxyethylacrylate, methyl methacrylate, ethyl methacrylate, propyl methacrylate, n-butyl methacrylate, hexyl methacrylate, 2-ethylhexyl methacrylate, phenyl methacrylate, benzyl methacrylate, 2-phenylethyl methacrylate, hydroxyethyl methacrylate, styrene, α-methylstyrene, vinyl naphthalene, vinylidene chloride, vinyl acetate, vinyl chloride, acrylonitrile, and the like.

The polyampholytes can be used as either an anionic dispersant or a cationic dispersant for the pigmented inks. In the dye based inks, the polyampholytes are used as ink additives. They can also be either anionic or cationic. It is important that the ionic character of the polyampholyte is compatible with those of other ionic components, such as dyes, in the ink composition.

The ionic nature of the polyampholytes is determined by the pH of the solution. In a strongly basic medium, the carboxylic acid groups are converted to negatively charged carboxylate ions, whereas the amine groups stay neutral. On the other hand, in acidic media, the amine groups are converted to positively charged ammonium ions, whereas the carboxylate groups are in the free acid form. Hence, when an anionic dispersant or additive is desired, the polyampholyte is neutralized with organic or inorganic bases. When a cationic dispersant or additive is desired, the polyampholyte is neutralized with organic or inorganic acids.

The cationic groups can also be prepared by converting the amine groups to tetraalkyl ammonium salt by using alkylating agents such as methyl iodide, methyl bromide, benzyl chloride, methyl p-toluene sulfonate, ethyl p-toluene sulfonate, dimethyl sulfate, and the like.

Polyampholytes that are selected to advantage in practicing the invention have a number average molecular weight below 20,000, preferably below 15,000, and typically in the range of 1,000–6000. The polyampholyte is present in the range of approximately 0.1 to 30%, preferably in the range of approximately 0.1 to 8% by weight of the total ink composition. If the amount of polyampholyte becomes too high, the ink color density will be unacceptable and it will become difficult to maintain desired ink viscosity. Dispersion stability of the pigment particles is adversely affected if insufficient polyampholyte is present.

OTHER INGREDIENTS

The ink may contain other ingredients. For example, surfactants may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing. In aqueous inks, the surfactants may be present in the amount of 0.01–5% and preferably 0.2–2%, based on the total weight of the ink composition.

Biocides may be used in the ink compositions to inhibit growth of microorganisms. In addition, sequestering agents such as EDTA may also be included to eliminate deleterious effects of heavy metal impurities. Other known additives, such as humectants, viscosity modifiers, and other acrylic or non-acrylic polymers may also be added to improve various properties of the inks.

INK PREPARATION AND INK PROPERTIES

The ink compositions of the present invention are prepared in the same manner as other ink jet ink compositions. If a pigment is used as the colorant, the dispersion is prepared by premixing the selected pigment(s) and dispersant in water. The dispersion step may be accomplished in a horizontal mill, a ball mill, a rubber two roll milling apparatus, an attritor, or by passing the mixture through a plurality of nozzles within a liquid jet interaction chamber at a liquid pressure of approximately 10,000 psi to produce a uniform dispersion of the pigment particles in the aqueous carrier medium. Additional solvents selected for the aqueous carrier medium may be present during the dispersion step.

The dye based inks are prepared in a well agitated vessel to dissolve the ingredients rather than in a dispersing equipment.

It is generally desirable to make the inks in a concentrated form, which is subsequently diluted with a suitable liquid to the appropriate concentration for use in the ink jet printing device. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Inks suitable for use with ink jet printing systems should have a surface tension in the range of about 20 dyne/cm to about 70 dyne/cm and, more preferably, in the range of 30 dyne/cm to about 70 dyne/cm at 20° C. Acceptable viscosities are no greater than 20 cP, and preferably below 10 cP at 20° C. The ink has physical properties compatible with a wide range of ejecting conditions, i.e., driving voltage, driving frequency, and pulse width for thermal ink jet printing devices, driving frequency for the piezo element for either a drop-on-demand device or a continuous device, and the shape and size of the nozzles, etc. They may be used with a variety of ink jet printers such as continuous, piezoelectric drop-on-demand, and thermal drop-on-demand, and are particularly adapted for use in thermal ink jet printers. The inks have excellent storage stability for a long period and do not clog the nozzles. Fixing the ink on the media substrate, such as paper, fabric, film, etc., can be carried out rapidly and accurately.

The printed ink images have clear color tones, high density, excellent water resistance and lightfastness. Furthermore, the ink does not corrode parts of the ink jet printing device it comes in contact with, and it is essentially ordorless.

EXAMPLES

Preparation A: Poly(methacrylic acid [10 units]-co-2-dimethylaminoethyl methacrylate [10 units]-co-2-phenylethyl methacrylate [10 units]) (MAA/DMAEMA/PEMA, 10/10/10)

To a stirred solution of 3.8 g of 1-methoxy-1-trimethylsiloxy-2-methyl-1-propene and 4 mL of tetrabutylammonium m-chlorobenzoate (1 M in acetonitrile) in 100 mL of tetrahydrofuran ("THF") was added a mixture of 35.1 g of 2-dimethylaminoethyl methacrylate (dried over 4Å molecular sieves), 49.2 g of 2-phenylethyl methacrylate (filtered through basic alumina) and 35.5 g of trimethylsilyl methacrylate. Upon dropwise addition of the monomers, the temperature rose from 26° C. to 72° C. during 15 minutes. The feed was briefly stopped and the temperature declined to 70° C. and remained constant during addition of the remaining monomer. Total time for monomer addition was 25 min. A small amount of methanol was added to quench the reaction 4 hrs. after the peak exotherm. 1H NMR analysis of an aliquot of the reaction mixture showed no residual monomers.

To this mixture was added 19 g of methanol, 10 g of water, and 70 µL of dichloroacetic acid and after refluxing for 8 hours, the product was isolated by precipitation with methanol. The residue was dried in a vacuum oven at 50° C. to give poly(methacrylic acid [10 units]-co-2-dimethylaminoethyl methacrylate [10 units]-co-2-phenylethyl methacrylate [10 units]). $^1$H NMR analysis showed an absence of any trimethylsilyl groups.

The random polyampholyte was neutralized by mixing 15 g of the polymer with 3.6 g of potassium hydroxide (45% solution) and 131.4 g of deionized water until a homogeneous 10% solution was obtained.

Preparation B: Poly(methacrylic acid [12 units]-co-2-dimethylaminoethyl methacrylate [8 units]-co-2-phenylethyl methacrylate [10 units]) (MAA/DMAEMA/PEMA, 12/8/10).

To a stirred solution of 2.35 mL (2.03 g, 11.6 mmol) of 1-methoxy-1-trimethylsiloxy-2-methyl-1-propene and 1 mL of tetrabutylammonium biacetate (0.1 M in propylene carbonate) in 60 mL of freshly distilled THF was added a mixture of 15.6 mL (14.6 g, 92.6 mmol) of 2-dimethylaminoethyl methacrylate (filtered through basic alumina under argon), 21.8 mL (22.0 g, 116 mmol) of 2-phenylethyl methacrylate (filtered through basic alumina under argon) and 24.9 mL (22.0 g, 139 mmol) of trimethylsilyl methacrylate. Upon dropwise addition of the monomers, the temperature rose from 24° C. to 30° C. Upon addition of 0.5 mL of tetrabutylammonium biacetate (0.1 M in propylene carbonate), the temperature rose to 31° C. Upon addition of 1 mL more of tetrabutylammonium biacetate (0.1 M in propylene carbonate), the temperature rose rapidly. When the temperature was 56° C, a water bath was placed under the reaction flask to control the exotherm. The reaction mixture was allowed to stir overnight. $^1$H NMR analysis of an aliquot of the reaction mixture showed no residual monomers.

To this mixture was added 35 mL of tetrabutylammonium fluoride (0.03 M in methanol), and after refluxing overnight, the product was isolated by evaporation under reduced pressure. The residue was dried in a vacuum oven at 50° C. to give 40.62 g of poly(methacrylic acid [12 units]-co-2-dimethylaminoethyl methacrylate [8 units]-co-2-phenylethyl methacrylate [10 units]). $^1$H NMR analysis showed an absence of any trimethylsilyl groups.

The random polyampholyte was neutralized by mixing 15 g of the polymer with 4.5 g of potassium hydroxide (45% solution) and 130.5 g of deionized water until a homogeneous 10% solution was obtained.

Preparation C: Poly(methacrylic acid [8 units]-co-2-dimethylaminoethyl methacrylate [12 units]-co-2-phenylethyl methacrylate [10 units]) (MAA/DMAEMA/PEMA, 8/12/10).

To a stirred solution of 2.22 mL (1.91 g, 11.0 mmol) of 1-methoxy-1-trimethylsiloxy-2-methyl-1-propene and 0.7 mL of tetrabutylammonium biacetate (0.1 M in propylene carbonate) in 60 mL of freshly distilled THF was added a mixture of 22.2 mL (20.7 g, 132 mmol) of 2-dimethylaminoethyl methacrylate (filtered through basic alumina under argon), 20.7 mL (20.9 g, 110 mmol) of 2-phenylethyl methacrylate (filtered through basic alumina under argon) and 15.7 mL (13.9 g, 87.8 mmol) of trimethylsilyl methacrylate. Upon dropwise addition of the monomers, the temperature rose from 25° C. to 30° C. Upon addition of 0.7 mL more of tetrabutylammonium biacetate (0.1 M in propylene carbonate), the temperature rose to 39° C. Upon addition of 0.5 mL more of tetrabutylammonium biacetate (0.1 M in propylene carbonate), the temperature rapidly rose. When the temperature was 58° C., a water bath was placed under the reaction flask to control the exotherm. The reaction mixture was allowed to stir overnight. $^1$H NMR analysis of an aliquot of the reaction mixture showed no residual monomers.

To this mixture was added 25 mL of tetrabutylammonium fluoride (0.03 M in methanol), and after refluxing overnight, the product was isolated by evaporation under reduced pressure. The residue was dried in a vacuum oven at 50° C. to give 45.25 g of poly(methacrylic acid [8 units]-co-2-dimethylaminoethyl methacrylate [12 units]-co-2-phenylethyl methacrylate [10 units]). $^1$H NMR analysis showed an absence of any trimethylsilyl groups.

The random polyampholyte was neutralized by mixing 15.0 g of the polymer with 1.3 g of potassium hydroxide (45% solution) and 133.7 g of deionized water until a homogeneous 10% solution was obtained.

Preparation D: Poly(methacrylic acid [13 units]-co-2-dimethylaminoethyl methacrylate [3 units]-co-benzyl methacrylate [10 units]) (MAA/DMAEMA/BzMA, 13/3/10)

To a stirred solution of 3.64 mL (3.14 g, 18.0 mmol) of 1-methoxy-1-trimethylsiloxy-2-methyl-1-propene and 0.15 mL of tetrabutylammonium m-chlorobenzoate (1 M in acetonitrile) in 60 mL of freshly distilled THF was added a mixture of 9.1 mL (8.5 g, 54 mmol) of 2-dimethylaminoethyl methacrylate (filtered through basic alumina under argon), 30.5 mL (31.7 g, 180 mmol) of benzyl methacrylate (filtered through basic alumina under argon) and 41.8 mL (37.0 g, 234 mmol) of trimethylsilyl methacrylate (as received). Upon dropwise addition of the monomers, the temperature rose from 26° C. with a strong steady exotherm. When the temperature was 47° C., a water bath was placed under the reaction flask to control the exotherm. The reaction mixture was allowed to stir overnight. $^1$H NMR analysis of an aliquot of the reaction mixture showed no residual monomers.

To this mixture was added 55 mL of tetrabutylammonium fluoride (0.03 M in methanol), and after refluxing overnight, the product was isolated by evaporation under reduced pressure. The residue was dried in a vacuum oven at 50° C. to give 56.96 g of poly(methacrylic acid [13 units]-co-2-dimethylaminoethyl methacrylate [3 units]-co-benzyl methacrylate [10 units]). $^1$H NMR analysis showed an absence of any trimethylsilyl groups.

The random polyampholyte was neutralized by mixing 15.0 g of the polymer with 6.1 g of potassium hydroxide (45% solution) and 128.9 g of deionized water until a homogeneous 10% solution was obtained.

Preparation E: Poly(methacrylic acid [13units]-co-2-dimethylaminoethyl methacrylate [4 units]-co-benzyl methacrylate [12 units]) (MAA/DMAEMA/BzMA, 13/4/12)

To a stirred solution of 7.6 mL (6.8 g, 29 mmol) of 1,1-bistrimethylsiloxy-2-methyl-1-propene and 0.3 mL of tetrabutylammonium m-chlorobenzoate (1 M in acetonitrile) in 100 mL of freshly distilled THF was added a mixture of 19.5 mL (18.2 g, 116 mmol) of 2-dimethylaminoethyl methacrylate (filtered through basic alumina under argon), 59.0 mL (61.4 g, 348 mmol) of benzyl methacrylate (filtered through basic alumina under argon) and 62.2 mL (55.1 g, 348 mmol) of trimethylsilyl methacrylate. Upon dropwise addition of the monomers, the temperature rose from 28° C. to 48° C. A water bath was placed under the reaction flask to control the exotherm while the monomer feed was continued. When the temperature decreased to 31° C. the water bath was removed. The temperature was 38° C. when the monomer feed was exhausted. The temperature continued to rise attaining a maximum of 58° C. The reaction mixture was allowed to stir overnight. $^1$H NMR analysis of an aliquot of the reaction mixture showed no residual monomers.

To this mixture was added 35 mL of methanol, and after refluxing with a catalytic amount of dichloroacetic acid for 20 hours, the product was isolated by evaporation under reduced pressure. The residue was dried in a vacuum oven at 50° C. to give 110.20 g of poly(methacrylic acid [12 units]-co-2-dimethylaminoethyl methacrylate [4 units]-co-benzyl methacrylate [12 units]). $^1$H NMR analysis showed an absence of any trimethylsilyl groups.

The random polyampholyte was neutralized by mixing 10.0 g of the polymer with 3.3 g of potassium hydroxide (45% solution) and 86.7 g of deionized water until a homogeneous 10% solution was obtained.

Preparation F: Poly(methacrylic acid [3units]-co-2-dimethylaminoethyl methacrylate [13 units]-co-benzyl methacrylate [10 units]) (MAA/DMAEMA/BzMA, 3/13/10).

To a stirred solution of 3.03 mL (2.61 g, 15.0 mmol) of 1-methoxy-1-trimethylsiloxy-2-methyl-1-propene and 0.1 mL of tetrabutylammonium m-chlorobenzoate (1 M in acetonitrile) in 60 mL of freshly distilled THF was added a mixture of 32.9 mL (30.7 g, 195 mmol) of 2-dimethylaminoethyl methacrylate (filtered through basic alumina under argon), 25.4 mL (26.4 g, 150 mmol) of benzyl methacrylate (filtered through basic alumina under argon) and 8.0 mL (7.1 g, 45 mmol) of trimethylsilyl methacrylate. Upon dropwise addition of the monomers, the temperature rose from 26° C. with a strong steady exotherm. When the temperature was 44° C., a water bath was placed under the reaction flask to control the exotherm. The reaction mixture was allowed to stir overnight. $^1$H NMR analysis of an aliquot of the reaction mixture showed no residual monomers.

To this mixture was added 15 mL of tetrabutylammonium fluoride (0.03 M in methanol), and after refluxing overnight, the product was isolated by evaporation under reduced pressure. The residue was dried in a vacuum oven at 50° C. to give 56.27 g of poly(methacrylic acid [3 units]-co-2-dimethylaminoethyl methacrylate [13 units]-co-benzyl methacrylate [10 units]). $^1$H NMR analysis showed an absence of any trimethylsilyl groups.

The random polyampholyte was neutralized by mixing 15.0 g of the polymer with 4.7 g of phosphoric acid (85.5% solution) and 130.3 g of deionized water until a homogeneous 10% solution was obtained.

Preparation G: Poly(methacrylic acid [3units]-co-N-benzyl-N,N-dimethyl-N-2-methacryloxyethylammonium chloride [13 units]-co-benzyl methacrylate [10 units]) (MAA/DMAEMA-BzCl/BzMA, 3/13/10).

To a stirred solution of 15.4 g of poly(methacrylic acid [3 units]-co-2-dimethylaminoethyl methacrylate [13 units]-co-benzyl methacrylate [10 units]) dissolved in 70 mL of freshly distilled THF and 30 mL of acetonitrile, was added 6.1 mL (6.7 g, 53 mmol) of benzyl chloride. The solution was heated to reflux. Upon reflux, 30 mL methanol were added to the reaction mixture to prevent the product from precipitating from solution. After refluxing for 10 hours, the product was isolated by precipitation in diethyl ether. The product was purified by precipitation from methanol with ether three times. After drying in a vacuum oven at 50° C. there was obtained poly(methacrylic acid [3 units]-co-N-benzyl-N,N-dimethyl-N-2-methacryloxyethylammonium chloride [13 units]-co-benzyl methacrylate [10 units]).

The random polyampholyte was dissolved by mixing 15 g of the polymer with 135 g of deionized water until a homogeneous 10% solution was obtained.

Example 1

| Ingredient | Parts by weight |
| --- | --- |
| Monastral Magenta RT-143D[a] | 30 |
| Polymer from Preparation A | 150 |
| Deionized water | 120 |

[a]Ciba Geigy Corp, Newport, DE

The above mentioned components were premixed in a plastic beaker by mechanical stirring until no lumps or dry clumps were visible. The mixture was dispersed in a microfluidizer (Microfluidics Corp., Watham, Mass.) by passing it through the interaction chamber 5 times and then circulated continuously for 15 minutes under a liquid pressure of about 7,000 psi. The resulting pigment dispersion had a 10% pigment concentration with an average particle size of 230 nm as determined by Brookhaven BI-90 particle sizer. The dispersion was filtered through a 1 micron high efficiency filter bag (3 M Filtration Products, St. Paul, Minn.). The final pH was 10.5.

The dispersion was let down with a 5/5/0.5/89.5 (by weight) mixture of diethylene glycol, Liponic®EG-1 (Lipo Chemicals Inc., Paterson, N.J.), Silwet®L-7607 (Union Carbide Corp., Danbury, Conn.), and deionized water to give a 3.5% ink.

Example 2

Example 1 was repeated except that Endurophthal BT-617 (Cookson Pigments, Newark, N.J.) was used in place of the magenta pigment and the mixture was passed through the interaction chamber 6 times at a liquid pressure of about 6,000 psi. The resulting pigment dispersion had an average particle size of 146 nm and a pH of 10.6. The pigment dispersion was filtered and let down as in Example 1.

Example 3

| Ingredient | Parts by weight |
| --- | --- |
| FW18, Carbon Black Pigment[a] | 22.8 |
| Polymer from Preparation A | 114.0 |
| Deionized water | 91.2 |

[a]Degussa Corp, Allendale, NJ

The above mentioned components were premixed and dispersed as in Example 1. The resulting pigment dispersion had an average particle size of 134 nm and a pH of 9.7. The dispersion was filtered as in Example 1 and was let down with a 3/7/90 mixture (by weight) of 2-pyrrolidone (Aldrich Chemical Co., Inc., Milwaukee, Wis.), Liponic®EG-1 and deionized water to give a 4.0% ink.

Example 4

Example 1 was repeated except that FW18 Carbon Black was used in place of the magenta pigment, the polymer from Preparation B was used, and the mixture was passed through the interaction chamber 5 times at a liquid pressure of about 8000 psi. The resulting dispersion had an average particle size of 120 nm and a pH of 9.59. The dispersion was filtered as in Example 1 and was let down with a 10/90 mixture (by weight) of diethylene glycol and deionized water.

Example 5

Example 4 was repeated except that the polymer from Preparation C was used and the mixture was passed through the interaction chamber continuously for 30 minutes under a liquid pressure of about 7,000 psi. The resulting pigment dispersion had an average particle size of 154 nm and a pH of 8.9. The dispersion was filtered and let down as in Example 4.

Example 6

Example 1 was repeated using FW18 Carbon Black Pigment and the polymer from Preparation D. In the dispersion step, the mixture was passed through the interaction chamber 5 times at a liquid pressure of about 7000 psi. The pigment dispersion had an average particle size of 113 nm and a pH of 9.3. The dispersion was filtered and let down as in Example 1.

Example 7

| Ingredient | Parts by weight |
| --- | --- |
| FW18, Carbon Black Pigment | 20 |
| Polymer from Preparation E | 100 |
| Deionized water | 80 |

The above mentioned components were premixed and dispersed as in Example 6. The dispersion had an average particle size of 114 nm and a pH of 9.2. The dispersion was filtered and let down as in Example 4.

Example 8

Example 2 was repeated using FW18 Carbon Black pigment and the polymer from Preparation F. The mixture was dispersed by passing it through the interaction chamber 10 times under a liquid pressure of about 6,000 psi. The resulting pigment dispersion had an average particle size of 110 nm and a pH of 3.0. The dispersion was filtered and let down as in Example 2.

Example 9

Example 4 was repeated using the polymer from Preparation G. The mixture was dispersed by passing it through the interaction chamber 15 times under a liquid pressure of about 6,500 psi. The resulting pigment dispersion had an average particle size of 119 nm and a pH of 2.6. The dispersion was filtered and let down as in Example 4.

Dispersion Stability

Each ink was subjected to four temperature cycles, each cycle consisting of 4 hours at 70° C. and 4 hours at −20° C.

The particle size was then measured as above and compared to the particle size before the test. The bulk appearance of these inks did not change after the temperature cycles. The particle size change was relatively small, indicating good dispersion stability. Results of the test are reported in Table 1.

Print Test

The inks were loaded in thermal ink jet pens and printed with a Hewlett packard DeskJet ink jet printer (Hewlett Packard Co., Palo Alto, Calif.) on Gilbert® bond paper (25% cotton, Mead Co., Dayton, Ohio). The optical density was measured by an X-Rite 418 densitometer (X-Rite, Inc., Grandville, Mich.). The print quality was judged by the optical density and edge acuity. Results are reported in Table 2. All pens printed very smoothly without any significant crusting problems. The completely dried prints were water resistant.

TABLE 1

| | Dispersion Stability | |
|---|---|---|
| Example | Before (nm) | After (nm) |
| 1 | 230 | 249 |
| 2 | 146 | 121 |
| 3 | 134 | 136 |
| 4 | 120 | 127 |
| 5 | 154 | 111 |
| 6 | 113 | 116 |
| 7 | 114 | 121 |
| 8 | 110 | 122 |
| 9 | 119 | 126 |

TABLE 2

| Example | O.D. | Print Quality |
|---|---|---|
| 1 | 1.13 | Excellent |
| 2 | 1.31 | Excellent |
| 3 | 1.57 | Excellent |
| 4 | 1.24 | Good |
| 5 | 1.46 | Excellent |
| 6 | 1.39 | Excellent |

TABLE 2-continued

| Example | O.D. | Print Quality |
|---|---|---|
| 7 | 1.25 | Good |
| 8 | 1.15 | Good |
| 9 | 1.18 | Good |

What is claimed is:

1. An aqueous ink jet ink composition comprising, by weight percent, (a) 30 to 95% aqueous carrier medium;

(b) from about 0.1 up to 30% colorant; and (c) 0.1 to 30% of at least one random polyampholyte containing at least one carboxylic acid group and at least one amine base group, said polyampholyte having a number average molecular weight below 20,000.

2. The ink of claim 1 wherein the colorant is a pigment and the polyampholyte is a dispersant for said pigment.

3. The ink of claim 2 wherein said polyampholyte has a dispersity less than 2.

4. The ink of claim 3 wherein said polyampholyte has a number average molecular weight in the range of approximately 1,000 to 6,000.

5. The ink of claim 2 wherein the polyampholyte is cationic.

6. The ink of claim 5 wherein the polyampholyte is neutralized with a base.

7. The ink of claim 2 wherein the polyampholyte is cationic.

8. The ink of claim 7 wherein the polyampholyte is neutralized with an acid.

9. The ink of claim 1 wherein the colorant is a dye.

10. The ink of claim 1 wherein the polyampholyte comprises approximately 0.1 to 8% of said ink.

11. The ink of claim 10 wherein the colorant is a pigment and the polyampholyte is a dispersant for said pigment.

12. The ink of claim 11 having a surface tension of approximately 30 to 70 dyne/cm at 20° C., and a viscosity below 10 cP at 20° C.

* * * * *